US012455535B2

(12) United States Patent
Macé

(10) Patent No.: US 12,455,535 B2
(45) Date of Patent: Oct. 28, 2025

(54) DEVICE FOR SELECTING AND CONTROLLING FUNCTIONS OF A HOROLOGICAL MOVEMENT

(71) Applicant: Montres Breguet S.A., L'Abbaye (CH)

(72) Inventor: Jérôme Macé, Le Pont (CH)

(73) Assignee: Montres Breguet S.A., L'Abbaye (CH)

( * ) Notice: Subject to any disclaimer, the term of this patent is extended or adjusted under 35 U.S.C. 154(b) by 343 days.

(21) Appl. No.: 18/173,839

(22) Filed: Feb. 24, 2023

(65) Prior Publication Data

US 2023/0341816 A1 Oct. 26, 2023

(30) Foreign Application Priority Data

Apr. 25, 2022 (EP) .................................... 22169828

(51) Int. Cl.
*G04B 3/00* (2006.01)
*G04B 13/02* (2006.01)

(52) U.S. Cl.
CPC ............. *G04B 3/001* (2013.01); *G04B 13/02* (2013.01)

(58) Field of Classification Search
CPC ........ G04B 3/001; G04B 13/02; G04B 3/046; G04B 3/048; G04B 27/004; G04B 27/02; G04F 7/0814
See application file for complete search history.

(56) References Cited

U.S. PATENT DOCUMENTS 5,220,541 A * 6/1993 Vuilleumier .......... G04F 7/0847 368/110
5,793,708 A * 8/1998 Schmidt ................ G04F 7/0814 368/110
6,406,176 B1 * 6/2002 Takahashi ............. G04F 7/0847 368/106

(Continued)

FOREIGN PATENT DOCUMENTS

CH 706 232 A2 9/2013
CH 712 451 A1 11/2017

(Continued)

OTHER PUBLICATIONS

European Search Report Issued Oct. 20, 2022 in European Application 22169828.5 filed on Apr. 25, 2022 (with English Translation of Categories of Cited Documents), 3 pages.

*Primary Examiner* — Edwin A. Leon
(74) *Attorney, Agent, or Firm* — Oblon, McClelland, Maier & Neustadt, L.L.P.

(57) ABSTRACT

A device for selecting and controlling functions of a horological movement, including a selector member arranged such that, when it is acted on, it causes a column wheel including a plurality of coaxial cams which are integral with one another for rotation as one, to rotate in a single direction of rotation, the device including a plurality of transmission yokes, each of which is arranged such that it bears against a cam specific thereto so as to be able to successively occupy, depending on the angular position of the cam, a rest (Continued)

position and an active position, each transmission yoke being configured such that when it occupies the active position, it is disposed in the path of a control member which is intended, when it is acted on from a rest position, to drive the transmission yoke located in an active position, towards a position for controlling a function specific thereto.

10 Claims, 2 Drawing Sheets

(56) References Cited

U.S. PATENT DOCUMENTS

| | | | | |
|---|---|---|---|---|
| 7,597,471 | B2 * | 10/2009 | Perret | G04F 7/0847<br>368/106 |
| 8,371,745 | B2 | 2/2013 | Manni | |
| 2008/0159081 | A1 | 7/2008 | Laucella et al. | |
| 2010/0187074 | A1 | 7/2010 | Manni | |

FOREIGN PATENT DOCUMENTS

| | | | |
|---|---|---|---|
| EP | 1 939 699 | A1 | 7/2008 |
| EP | 2 367 080 | A1 | 9/2011 |

* cited by examiner

DEVICE FOR SELECTING AND CONTROLLING FUNCTIONS OF A HOROLOGICAL MOVEMENT

CROSS-REFERENCE TO RELATED APPLICATION

This application claims priority to European Patent Application No. 22169828.5 filed on Apr. 25, 2022, the entire disclosure of which is hereby incorporated herein by reference.

TECHNICAL FIELD OF THE INVENTION

The invention relates to the horology field, and in particular to horological movements.

More particularly, the invention relates to a device for selecting and controlling the functions of a horological movement and to a horological movement comprising said device.

TECHNOLOGICAL BACKGROUND

Typically, the functions of a horological movement, such as setting the current time, or winding the mainspring, etc., are performed using the winding stem. In particular, each of these functions is controlled by the rotation of the winding stem when it occupies a specific axial position. Watches with a date indicator also exist, wherein the winding stem can be moved into a certain axial position in order to set the date or day indicator, by rotating said stem.

In these watches, the number of functions to be set is limited by the number of axial positions that can be occupied by the winding stem. It is understood that, in order for it to remain simple to use, a watch with a winding stem that has more than three axial positions is difficult to obtain.

Furthermore, above three axial positions of the winding stem, i.e. for more than three functions to be controlled, the horological movement would be particularly complex to implement since, in each of its axial positions, the winding stem must be kinematically connected to specific components of the horological movement in order to be able to act on a given function.

Another drawback of these watches is that the winding stem is operated by the user by means of a crown attached to the free end of said winding stem. This crown typically has small dimensions and can be difficult to handle, especially when moving the winding stem into a given axial position in order to control a desired function.

To correct certain functions, such as complete calendars, moon phases, another time zone, etc., some horological movements include correctors that are operated by pressure, typically applied using a suitable tool. However, the use of these correctors is not easy and often requires the watch to be removed from the user's wrist.

SUMMARY OF THE INVENTION

The invention overcomes the aforementioned drawbacks by providing a solution for selecting and controlling a function of a horological movement in a simple and quick way for a user.

Moreover, another objective of the invention is to propose a device of simple design, in order to facilitate the integration thereof inside a horological movement, in particular by limiting the number of components while maximising the number of functions that can be selected and controlled.

Another advantage of the invention is that it allows the function that is selected to be displayed.

To this end, the present invention relates to a device for selecting and controlling functions of a horological movement, comprising a selector member arranged such that, when it is acted on, it causes a column wheel comprising a plurality of coaxial cams which are integral with one another for rotation as one, to rotate in a single direction of rotation. The device further includes a plurality of transmission yokes, each of which is arranged such that it bears against a cam specific thereto so as to be able to successively occupy, depending on the angular position of said cam, a rest position and an active position, each transmission yoke being configured such that when it occupies the active position, it is disposed in the path of a control member which is intended, when it is acted on from a rest position, to drive the transmission yoke located in an active position, towards a position for controlling a function specific thereto.

In specific embodiments, the invention can further include one or more of the following features, which must be considered singly or according to any combination technically possible.

In specific embodiments, the cams are configured to cause only one of the transmission yokes to move, between two successive angular positions of the column wheel, from its rest position to its active position, and to cause another of the transmission yokes to move from its active position to its rest position, the other transmission yokes thus being held in their rest position.

In specific embodiments, the cams are configured such that when the column wheel occupies a predefined angular position, all of the transmission yokes occupy their rest position.

In specific embodiments, the cams have an identical profile.

In specific embodiments, the device according to the invention comprises a display that is integral with the column wheel for rotation therewith or kinematically connected to the column wheel, said display being configured to take a position that is representative of the angular position of said column wheel.

In specific embodiments, each cam has a profile comprising, on the one hand, at least one sector of a circle whose centre is coincident with the axis of rotation of said cam, and on the other hand, at least one tooth extending radially beyond said sector of a circle.

In specific embodiments, wherein each transmission yoke includes a catch adapted, when said yoke is in the active position, to cooperate with a component of the horological movement so as to perform a given function specific to said yoke.

In specific embodiments, the device according to the invention includes a spring biasing the selector member into a rest position in which it rests against the column wheel, a spring biasing the control member into its rest position, and a plurality of springs, each arranged to hold a transmission yoke such that it bears against the column wheel.

In specific embodiments, the control member includes a control lever against which bears a control push-piece.

In specific embodiments, the selector member includes a selector lever against which is arranged a selection push-piece.

BRIEF DESCRIPTION OF THE FIGURES

Other features and advantages of the invention will become apparent upon reading the following detailed description given by way of a non-limiting example, and with reference to the accompanying drawings, in which.

It should be noted that the figures are not necessarily drawn to scale for clarity purposes.

DETAILED DESCRIPTION OF THE INVENTION

The device 10 for selecting and controlling a function of a horological movement according to the invention comprises a function selector member 20 and a member 30 for controlling the selected function. Within the scope of the present invention, the functions referred to are, for example, setting a day, a date, a month and/or a year, starting, stopping and resetting a countdown timer, setting the seconds, hours and/or minutes of an alarm, or setting the current time, etc.

The selection and control device 10 is intended to be arranged in a case of a watch (not shown in the figures) comprising the horological movement, the selector member 20 and the control member 30 being arranged so as to open outside the case in order to be accessible and be acted on by a user.

As described in detail hereinbelow, the selector member 20 and the control member 30 are independent of one another in the sense that they are not kinematically connected to one another.

The selection and control device 10 includes a column wheel 40 with which the selector member 20 cooperates such that, when the latter is acted on by a user, it causes said column wheel 40 to rotate in a single direction of rotation and through a predefined angle.

Figures 1A, 1B:
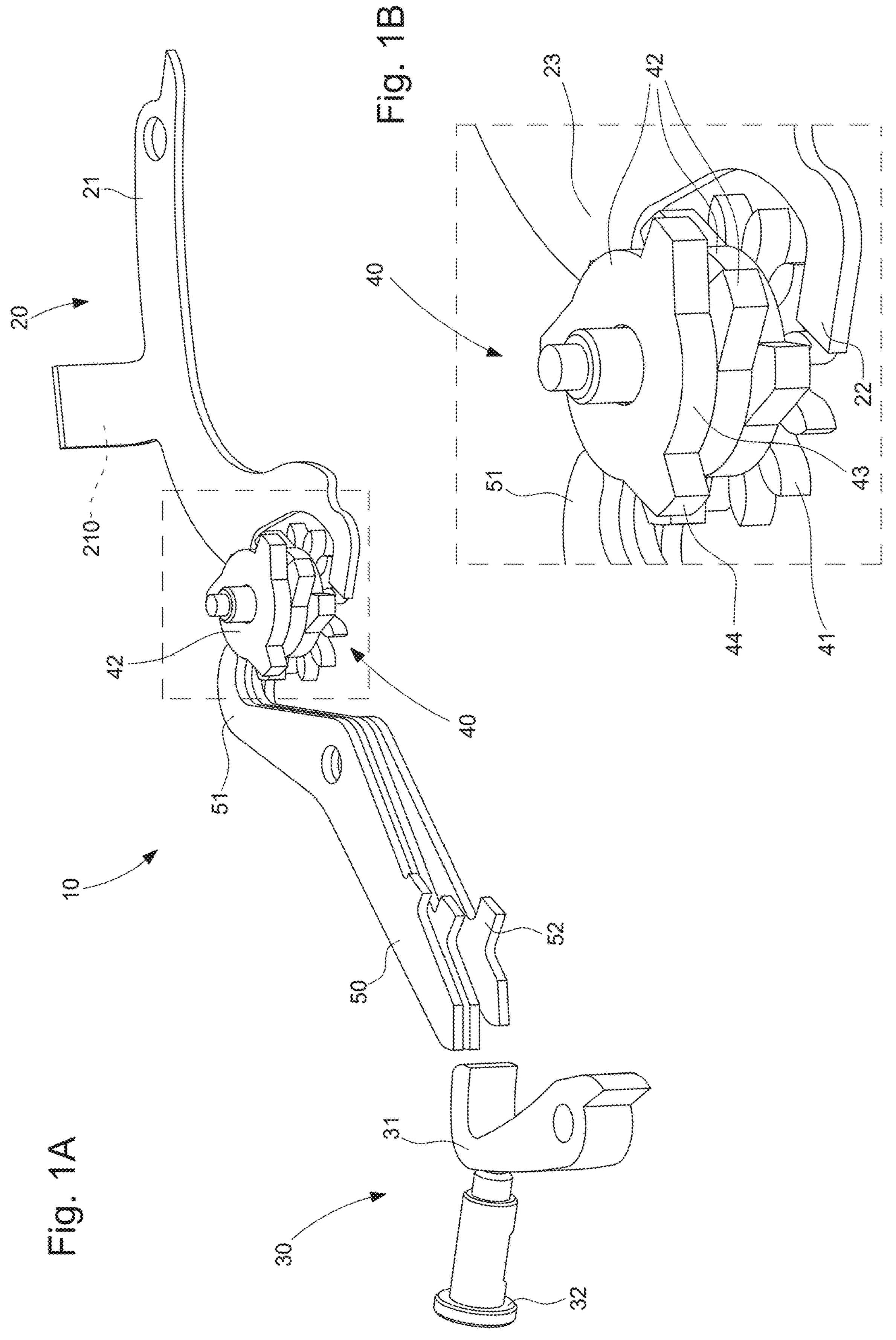
FIGS. 1A and 1B show perspective views of a device for selecting and controlling functions of a horological movement according to a preferred example embodiment of the present invention.
Figure 2:
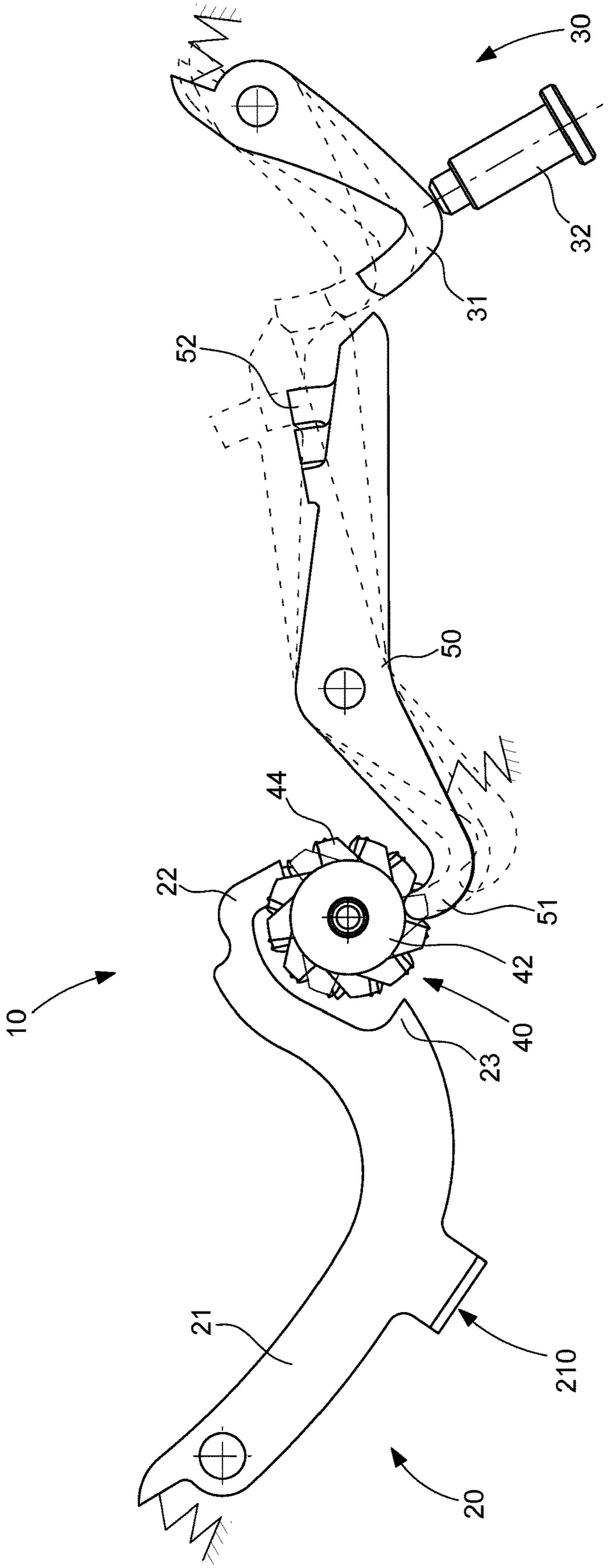
FIG. 2 shows a top view of the device in FIGS. 1A and 1B.

In particular, as shown in FIGS. 1A-B and 2 in the preferred example embodiment of the present invention, the selector member 20 includes a selector lever 21 arranged such that it can rotate relative to a structure of the horological movement at a first free end. The selector lever 21 comprises, at a second free end, a hook 22 and a beak 23 between which is formed an indentation in which the column wheel 40 is arranged. In other words, the column wheel 40 is interposed between the hook 22 and the beak 23 in the preferred example embodiment of the invention.

Preferably, the selector member 20 is subjected to the action of a spring and biased to be held in a rest position wherein the hook 22 rests against the column wheel 40.

Advantageously, the hook 22 and the beak 23 are adapted to cooperate alternately with a ratchet 41 of the column wheel 40 each time the selector lever 21 is acted on by the user. More specifically, when the user applies pressure to the selector lever 21, the beak 23 comes into contact with a tooth of the ratchet 41 and subjects the column wheel 40 to a moment of force, causing it to rotate through a certain angle. When the user stops acting on the selector lever 21, the spring causes said selector lever 21 to move into its rest position and the hook 22 to engage between two teeth of the ratchet 41. The column wheel is thus held in a stable position by the cooperation between the hook 22 and the ratchet 41.

The column wheel 40 comprises a plurality of coaxial cams 42, which are superimposed on one another. The cams 42 are integral with one another to rotate as one, as well as with the ratchet 41. As shown in FIGS. 1A-B and 2, each of the cams 42 receives a transmission yoke 50 specific thereto which bears thereagainst, such that when the column wheel 40 rotates, the transmission yokes 50 are driven in alternating rotation by said cams 42, between two extreme positions referred to hereinbelow as the "rest position" and the "active position". In other words, the cams 42 are configured such that, when the column wheel 40 rotates, they cause the transmission yokes 50 to move alternately between their active position and their rest position.

Preferably, the cams 42 are arranged such that only one transmission yoke 50 at a time is moved into the active position, said transmission yokes 50 being driven successively, one after the other, into their active position, when the column wheel 40 rotates. In other words, when one of the transmission yokes 50 is in its active position, all of the other cams 42 are in their rest position.

The cams 42 preferably all have the same cam profile and are angularly offset from one another, as shown in FIGS. 1A-B and 2. In particular, the cams 42 each include, on the one hand, at least one sector of a circle 43 whose centre is coincident with the axis of rotation of said cam 42, and on the other hand, at least one tooth 44 extending radially beyond said sector of a circle 43. In the example shown in the figures, the cams 42 each include three sectors of a circle 43 separated from one another by a tooth 44.

As can be seen in the figures, the transmission yokes 50 can be superimposed on one another and can be capable of moving in rotation about the same axis of rotation to make the device more compact. Each transmission yoke 50 extends between a first free end via which it is intended to cooperate with the column wheel 40 and a second free end via which it is adapted to cooperate with the control member 30.

The first free end of each transmission yoke 50 includes a feeler-spindle 51 intended to be held such that it bears against one of the cams 42 under the effect of a spring. When the feeler-spindle 51 of a transmission yoke 50 bears against one of the sectors of a circle 43 of the cam 42 with which it is associated, the transmission yoke 50 is in the rest position, and when the feeler-spindle 51 rests against one of the teeth 44 of the cam 42 with which it is associated, the transmission yoke 50 is in the active position.

Advantageously, when one of the transmission yokes 50 is in the active position, it is disposed in the path of the control member 30 such that, when the latter is acted on by a user from a rest position, it drives the transmission yoke 50 that is in an active position, into a position for controlling a function specific thereto. When a transmission yoke 50 is driven into the control position, it is moved away from the column wheel 40 such that the feeler-spindle 51 thereof is no longer in contact with the cam 42 associated therewith.

In other words, and as shown in FIG. 2, when the transmission yokes 50 are in their rest position, they are not capable of being driven by the control member 30.

In particular, as shown in FIGS. 1A-B and 2, when one of the transmission yokes 50 is in the active position, it is capable of being subjected to a moment of force, at the second free end thereof, by the control member 30 capable of moving it into the control position.

Preferably, the cams 42 are configured such that when the column wheel 40 occupies a predefined angular position, all of the transmission yokes 50 occupy their rest position. The user can thus select a neutral state of the selection and control device 10 by acting on the selector member 20, in which state no function of the horological movement can be operated by the control member 30.

In order to be able to interact with a component of the horological movement (not shown) adapted to perform a given function specific to said transmission yoke 50, when the control member 30 is acted on, each transmission yoke 50 includes a catch 52.

In the preferred example embodiment of the invention, the catch 52 of each transmission yoke 50 is arranged at the second free end, and extends from a sidewall of said transmission yoke 50. Advantageously, as shown in FIGS. 1A-B and 2, the catches 52 are arranged respectively on the transmission yokes 50 at different locations from one another, such that they can act on different components of the horological movement, or act in a different way, such that each of the transmission yokes is able to control different functions. More specifically, the catches are offset from one another in a direction that extends between the axis of rotation of the transmission yokes 50 and the second free end of the transmission yokes 50.

It should be noted that a person skilled in the art is capable of designing the link or kinematic chain between each catch 52 and the component of the horological movement adapted to perform a given function with which it is intended to interact. Furthermore, the components of the horological movement other than the elements of the selection and control device 10 are thus not shown in the figures, without this hindering the correct understanding of the description of the invention, insofar as they are not as such part of the present invention.

Preferably, the control member 30 is subjected to the action of a spring and biased into its rest position. Thus, when it is not acted on by a user, the control member 30 is biased to occupy its rest position, thus allowing the transmission yokes 50 to move into their active position.

In the example embodiment shown in FIGS. 1A-B and 2, the control member 30 includes a control lever 31 against which a control push-piece 32 bears and which is intended to be acted on by the user in order to control the selected function. Moreover, the selector lever 21 includes a pressing area 210 which the user is intended to press in order to act on the selector member 20.

Alternatively, the selector member 20 can include a selection push-piece (not shown in the figures) arranged against the pressing area 210 of the selector lever 21 and which the user is intended to press in order to act on the selector member 20.

The device according to the present invention can advantageously include a display (not shown in the figures) indicating the selected function to the user, i.e. indicating which function can be operated by the transmission yoke 50 if the control member 30 is acted on, or optionally indicating the neutral state of said device.

In particular, the display is integral with the column wheel 40 for rotation therewith or kinematically connected to the column wheel 40, and is configured to take a position that is representative of the angular position of said column wheel 40.

To summarise how the selection and control device 10 operates, each time the user presses the selector member 20, and in particular the pressing area 210 thereof, the column wheel 40 rotates through a predefined angle and a transmission yoke 50 pivots into its active position. To select a desired function, the user must thus press the selector member 20 as many times as necessary in order to pivot the transmission yokes 50, one after the other, until the transmission yoke 50 associated with the desired function is pivoted into the active position.

Once the desired function has been selected, it can be operated by the user pressing the control member 30, in particular the control push-piece 32 in the preferred example embodiment of the invention, until the control lever 31 pushes the transmission yoke 50, which is in the active position, into its control position, which then interacts with a component of the horological movement adapted to perform a given function.

As understood from reading the present description of the invention, the device 10 for selecting and controlling a function of a horological movement includes as many transmission yokes 50 and cams 42 as there are functions to be selected and controlled.

Generally speaking, it should be noted that the implementations and embodiments considered hereinabove have been described by way of non-limiting examples, and that other alternative implementations and embodiments can thus be envisaged.

The invention claimed is:

1. A device for selecting and controlling functions of a horological movement, the device comprising:

a selector member arranged so that when said selector member is acted on, said selector member causes a column wheel comprising a plurality of coaxial cams integral with one another to rotate together in a single direction of rotation; and a plurality of transmission yokes, each of which is arranged such that each transmission yoke bears against a cam specific thereto so as to be able to successively occupy, depending on an angular position of said cam, a rest position and an active position, wherein each transmission yoke is independently configured so that when a transmission yoke occupies an active position, that transmission yoke is disposed in a path of a corresponding control member, and when a transmission yoke is acted on from a rest position, to drive the transmission yoke to an active position, that transmission yoke is moved towards a position for controlling a function specific thereto.

2. The device according to claim 1, wherein the cams are configured to cause only one of the transmission yokes to move, between two successive angular positions of the column wheel, from its rest position to its active position, and to cause another of the transmission yokes to move from its active position to its rest position.

3. The device according to claim 1, wherein the cams are configured such that when the column wheel occupies a predefined angular position, all of the transmission yokes occupy their rest position.

4. The device according to claim 1, wherein the cams have an identical profile.

5. The device according to claim 1, further comprising:

a display integral with the column wheel for rotation therewith or kinematically connected to the column wheel, said display being configured to take a position that is representative of an angular position of said column wheel.

6. The device according to claim 1, wherein each cam has a profile, comprising:

at least one sector of a circle whose center is coincident with the axis of rotation of said cam; and at least one tooth extending radially beyond said sector of a circle.

7. The device according to claim 1, wherein each transmission yoke comprises a catch adapted, when said yoke is in the active position, to cooperate with a component of the horological movement so as to perform a given function specific to said yoke.

8. The device according to claim 1, further comprising:

a spring biasing the selector member into a rest position in which said selector member rests against the column wheel;

a spring biasing the control member into its rest position; and a plurality of springs, each arranged to hold a transmission yoke so that said transmission yoke bears against the column wheel.

9. The device according to claim 1, wherein the control member comprises a control lever against which a control push-piece bears.

10. The device according to claim 1, wherein the selector member comprises a selector lever against which a selection push-piece is arranged.

* * * * *